(12) United States Patent
Jeong et al.

(10) Patent No.: US 10,045,205 B2
(45) Date of Patent: *Aug. 7, 2018

(54) METHOD FOR CHANGING AID IN WIRELESS LAN SYSTEM (71) Applicant: KT Corporation, Seongnam-si (KR)

(72) Inventors: Yang Seok Jeong, Seoul (KR); Hae Seok Yang, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,921

(22) Filed: Feb. 27, 2017

(65) Prior Publication Data
US 2017/0171743 A1    Jun. 15, 2017

Related U.S. Application Data (63) Continuation of application No. 15/181,555, filed on Jun. 14, 2016, now Pat. No. 9,622,073, which is a (Continued)

(30) Foreign Application Priority Data

Jun. 28, 2012 (KR) .................. 10-2012-0069963
Apr. 2, 2013 (KR) .................. 10-2013-0035516
May 14, 2013 (KR) .................. 10-2013-0054185

(51) Int. Cl.
*H04W 8/26* (2009.01)
*H04W 52/02* (2009.01)
(Continued)

(52) U.S. Cl.
CPC ........... *H04W 8/26* (2013.01); *H04L 61/2038* (2013.01); *H04L 61/3015* (2013.01);
(Continued)

(58) Field of Classification Search
CPC ... H04W 8/26; H04W 52/0216; H04W 84/12; H04W 48/10; Y02B 60/50; H04L 61/2038
See application file for complete search history.

(56) References Cited

U.S. PATENT DOCUMENTS

2004/0264428 A1   12/2004  Choi et al.
2005/0172024 A1*   8/2005  Cheifot ............ H04L 29/12009
                                                    709/225
(Continued)

FOREIGN PATENT DOCUMENTS

JP         4279149        3/2009
JP         5809758       11/2015
(Continued)

OTHER PUBLICATIONS

Bonghoe Kim, Association ID management for TGah, Jan. 2011, IEEE 802.11-11/0088r1, 7 pages.
(Continued)

*Primary Examiner* — Ajay Cattungal
(74) *Attorney, Agent, or Firm* — Sughrue Mion, PLLC (57) ABSTRACT

Disclosed is a method for changing an AID in a wireless LAN system. The method for changing an AID of a terminal by an access point comprises: a step of receiving an AID reassignment frame from the access point; a step of extracting an AID reassignment counter value from the AID reassignment frame; and a step of changing the AID of the terminal to the new AID included in the AID reassignment frame after the beacon periods of the access point indicated by the AID reassignment counter value extracted from the AID reassignment frame reception time have elapsed. Thus, a conflict between AIDs can be prevented.

14 Claims, 8 Drawing Sheets

Related U.S. Application Data continuation of application No. 14/411,301, filed as application No. PCT/KR2013/005734 on Jun. 27, 2013, now Pat. No. 9,398,446.

(51) Int. Cl.
*H04L 29/12* (2006.01)
*H04W 48/10* (2009.01)
*H04W 84/12* (2009.01)

(52) U.S. Cl.
CPC ....... *H04W 48/10* (2013.01); *H04W 52/0216* (2013.01); *H04W 84/12* (2013.01); *Y02D 70/00* (2018.01); *Y02D 70/142* (2018.01); *Y02D 70/144* (2018.01); *Y02D 70/22* (2018.01)

(56) References Cited

U.S. PATENT DOCUMENTS

| | | |
|---|---|---|
| 2007/0060128 A1 | 3/2007 | Kil |
| 2008/0170519 A1 | 7/2008 | Sim et al. |
| 2008/0170520 A1 | 7/2008 | Sim et al. |
| 2012/0044925 A1 | 2/2012 | Lee et al. |
| 2012/0051312 A1 | 3/2012 | Noh et al. |
| 2013/0250833 A1 | 9/2013 | Kim et al. |
| 2015/0009878 A1* | 1/2015 | Kim ......................... H04W 4/70 370/311 |
| 2015/0131640 A1* | 5/2015 | Seok ..................... H04W 28/06 370/338 |
| 2015/0156722 A1* | 6/2015 | Kim ..................... H04W 74/08 370/311 |

FOREIGN PATENT DOCUMENTS

| | | |
|---|---|---|
| JP | 5837703 | 12/2015 |
| JP | 5873566 | 3/2016 |
| JP | 6022055 | 11/2016 |
| KR | 10-2008-0114469 A | 12/2008 |
| WO | 2013/077690 A1 | 5/2013 |

OTHER PUBLICATIONS

Jeongki Kim, AID Reassignment Protocol, May 14, 2012, IEEE 802.11-12/0364r3, 11 pages.

* cited by examiner

METHOD FOR CHANGING AID IN WIRELESS LAN SYSTEM

CLAIM FOR PRIORITY

This application is a continuation application of U.S. patent application Ser. No. 15/181,555, filed on Jun. 14, 2016, which is a continuation application of U.S. patent application Ser. No. 14/411,301, filed on Dec. 24, 2014, now U.S. Pat. No. 9,398,446, which is a National Stage of International Application No. PCT/KR2013/005734, filed on Jun. 27, 2013, which claims priority to Korean Patent Application No. 10-2012-0069963, filed on Jun. 28, 2012, Korean Patent Application No. 10-2013-0035516 filed on Apr. 2, 2013, and Korean Patent Application No. 10-2013-0054185, filed on May 14, 2013, in the Korean Intellectual Property Office (KIPO), the entire contents of which are hereby incorporated by reference.

BACKGROUND

1. Technical Field

Example embodiments of the present invention relate in general to a method of changing an association ID (AID) and more specifically to a method of changing an old AID to a new AID in a wireless local area network (WLAN) system.

2. Related Art

Various wireless communication techniques are being developed along with the recent development of an information communication technology. In particular, wireless local area network (WLAN) is a technology that can provide a wireless connection to the Internet in a limited service area such as a home or office building using portable terminals, for example, a personal digital assistant (PDA), a laptop computer, and a portable multimedia player (PMP) based on a wireless frequency technology.

Standards for WLAN technology is developed and standardized by IEEE 802.11 working group (WG) in the Institute of Electrical and Electronics Engineering (IEEE) 802.11. IEEE 802.11a provides a transfer rate of 54 Mbps using 5 GHz unlicensed band. IEEE 802.11b provides a transfer rate of 11 Mbps by using direct sequence spread spectrum (DSSS) in 2.4 GHz band. IEEE 802.11g provides a transfer rate of 54 Mbps by using orthogonal frequency division multiplexing (OFDM) in 2.4 GHz band. IEEE 802.11n provides a transfer rate of 300 Mbps for two spatial streams by using multiple-input multiple-output OFDM (MIMO-OFDM). IEEE 802.11n supports a channel bandwidth of up to 40 MHz and, in this case, provides a transfer rate of 600 Mbps.

Along with the wide deployment of WLAN and the diversification of applications using WLAN, new WLAN techniques are increasingly needed to support higher throughput than IEEE 802.11n. Very high throughput (VHT) WLAN is one of IEEE 802.11 WLAN techniques, which is proposed to support a data processing rate of 1 Gbps or more. In particular, IEEE 802.11ac is developed as a standard for providing a very high throughput on the 5 GHz band, and IEEE 802.11ad is developed as a standard for providing a very high throughput on the 60 GHz band.

In systems based on the WLAN techniques, an access point (AP) manages stations by assigning a unique association ID (AID) to each of the stations whenever the station accesses the AP. During an operation between the AP and the station in the WLAN system, the AID, which is a unique number of the station, may be needed to be changed. When reassigning an AID to the station, the AP may reassign a new AID to the station, and the station may change an old AID to the reassigned new AID. In this case, when AIDs are reassigned to a plurality of stations, times at which old AIDs are changed to the reassigned new AIDs may be different for each station, resulting in a collision between the AIDs.

SUMMARY

Accordingly, example embodiments of the present invention are provided to substantially obviate one or more problems due to limitations and disadvantages of the related art.

Example embodiments of the present invention provide a method of changing an AID of a station, which may prevent a collision between AIDs when an AID is changed in a WLAN system.

In some example embodiments, a method of changing an association ID (AID) of a terminal includes receiving an AID reassignment frame from an access point; extracting an AID reassignment counter value from the AID reassignment frame; and changing the AID of the terminal to a new AID included in the AID reassignment frame after beacon intervals of the access point that are indicated by the extracted AID reassignment counter value have passed since a reception time of the AID reassignment frame.

When the AID reassignment counter value extracted in the extracting of the AID reassignment counter value is zero, the changing of the AID of the terminal may include changing the AID of the terminal to the new AID included in the AID reassignment frame at the reception time of the AID reassignment frame.

The AID reassignment frame may be received corresponding to a power save (PS)-Poll frame transmitted by the terminal to the access point.

When there is at least one terminal having an AID that is to be changed simultaneously with the AID of the terminal, the AID reassignment counter value may be determined in consideration of both of a listen interval of the terminal and a listen interval of the at least one terminal.

The AID reassignment counter value may be configured such that the AID of the terminal is changed after a longest listen interval among the listen interval of the terminal and the listen interval of the at least one terminal.

In other example embodiments, a method of reassigning, by an access point, an association ID (AID) of a terminal may include generating an AID reassignment frame including an AID reassignment counter value that designates a new AID and a time at which a change to the new AID is made; and transmitting the AID reassignment frame to the terminal, wherein the AID reassignment counter value indicates that the AID of the terminal is changed to a new AID included in the AID reassignment frame after beacon intervals of the access point that are indicated by the AID reassignment counter value have passed since a transmission time of the AID reassignment frame.

When the AID reassignment counter value is zero, the AID reassignment counter value indicates that the AID of the terminal is changed to the new AID at the transmission time of the AID reassignment frame.

The AID reassignment frame may be received corresponding to a power save (PS)-Poll frame received by the access point from the terminal.

When there is at least one terminal having an AID that is to be changed simultaneously with the AID of the terminal, the AID reassignment counter value may be determined in consideration of both of a listen interval of the terminal and a listen interval of the at least one terminal.

The AID reassignment counter value may be configured such that the AID of the terminal is changed after a longest listen interval among the listen interval of the terminal and the listen interval of the at least one terminal.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

While the invention is susceptible to various modifications and alternative forms, specific embodiments thereof are shown by way of example in the drawings and will herein be described in detail.

However, it is to be understood that the present invention is not limited to the specific exemplary embodiments, but includes all modifications, equivalents, and substitutions included in the spirit and the scope of the present invention.

Relational terms such as first, second, and the like may be used for describing various elements, but the elements should not be limited by the terms. These terms are only used to distinguish one element from another. For example, a first component may be named a second component without being departed from the scope of the present invention and the second component may also be similarly named the first component. The use of the term of 'and/of' means that combination of a plurality of related and described items or one items among a plurality of related and described items is included.

When it is mentioned that a certain component is "coupled with" or "connected with" another component, it may be understood that another component can exist between the two components although the component can be directly coupled or connected with the another component. Meanwhile, when it is mentioned that a certain component is "directly coupled with" or "directly connected with" another component, it has to be understood that another component does not exist between the two components.

In the following description, the technical terms are used only for explaining a specific exemplary embodiment while not limiting the present disclosure. Singular forms used herein are intended to include plural forms unless explicitly indicated otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or a combination thereof.

Unless otherwise defined, all terms (including technical and scientific terms) used herein have the same meaning as commonly understood by one of ordinary skill in the art to which this invention belongs. Terms such as terms that are generally used and have been in dictionaries should be construed as having meanings matched with contextual meanings in the art. In this description, unless defined clearly, terms are not ideally, excessively construed as formal meanings.

Hereinafter, exemplary embodiments of the present invention will be described in detail with reference to the accompanying drawings. In describing the invention, in order to facilitate the overall understanding of the invention, like numbers refer to like elements throughout the description of the figures and the repetitive description thereof will be omitted.

Throughout this specification, a station (hereinafter also referred to as an STA) is any functional medium including a medium access control (MAC) and wireless-medium physical layer (PHY) interface conforming to the IEEE 802.11 standard. The STA may include an access point (AS) STA and a non-AP STA. The AP STA may be simply referred to as an access point (hereinafter also referred to as an AP), and the non-AP STA is simply referred to as a terminal.

The STA includes a processor and a transceiver, and may further include a user interface, a display device, and so on. The processor is a functional unit devised to generate a frame to be transmitted through a wireless network or to process a frame received through the wireless network, and performs various functions to control the STA. The transceiver is functionally connected to the processor and is a functional unit devised to transmit and receive a frame for the STA through the wireless network.

The AP may be called a convergence controller, a base station (BS), a node-B, an eNode-B, a base transceiver system, or a site controller, and may include some or all of functions thereof.

The terminal may be called a wireless transmit/receive unit (WTRU), a user equipment (UE), a user terminal (UT), an access terminal (AT), a mobile station (MS), a mobile terminal, a subscriber unit, a subscriber station (SS), a wireless device, a mobile subscriber unit, or the like and may include some or all of functions thereof.

Here, the terminal may include a communication enabled desktop computer, laptop computer, tablet PC, wireless phone, mobile phone, smartphone, e-book reader, portable multimedia player (PMP), portable gaming console, navigation device, digital camera, digital multimedia broadcasting (DMB) player, digital audio recorder, digital audio player, digital picture recorder, digital picture player, digital video recorder, digital video player, etc.

Figure 1:
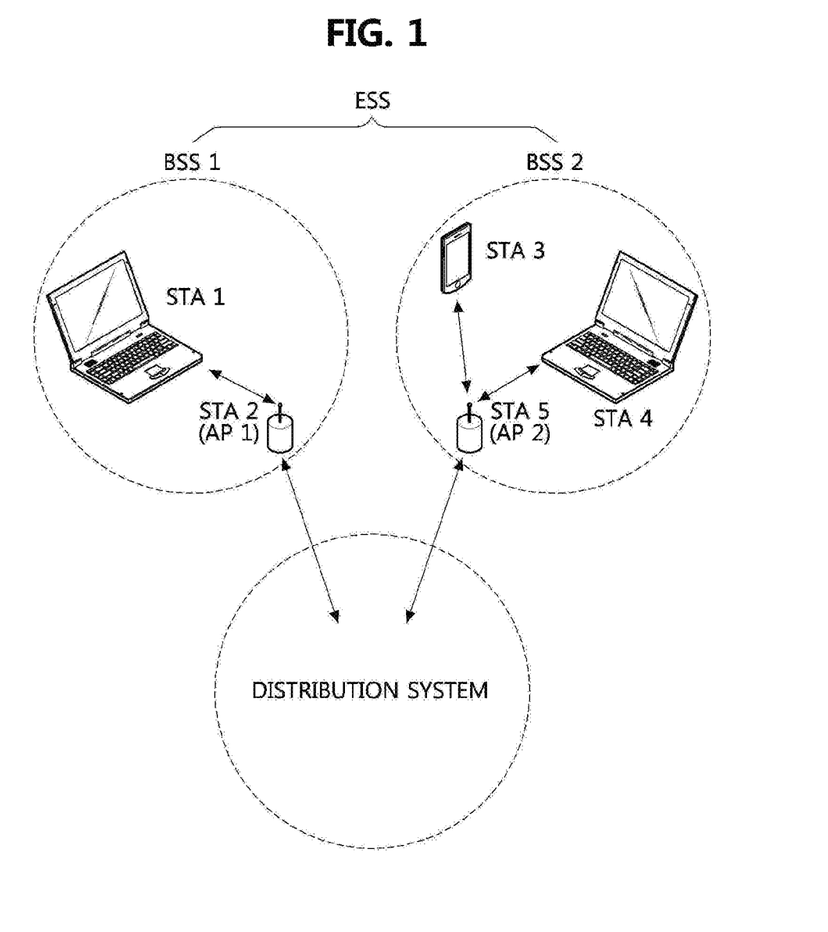
FIG. 1 is a conceptual view showing a configuration of an IEEE 802.11 WLAN system according to an embodiment of the present invention.

FIG. 1 is a conceptual view showing a configuration of an IEEE 802.11 WLAN system according to an embodiment of the present invention.

Referring to FIG. 1, the IEEE 802.11 WLAN system includes at least one basic service set (BSS). The BBS denotes a set of stations STA 1, STA 2 (AP 1), STA 3, STA 4, and STA 5 (AP 2) that may be successfully synchronized to communicate with one another, but does not denote a certain region.

The BBS may be classified into an infrastructure BSS and an independent BSS (IBSS). BBS 1 and BBS 2 denote the infrastructure BSS. BBS 1 may include a terminal STA 1, an access point STA 2 (AP 1) that provides a distribution service, and a distribution system (DS) that connects a plurality of access points STA 2 (AP 1) and STA 5 (AP 2). In BSS 1, the access point STA 2 (AP 1) manages the terminal STA 1.

BBS 2 may include the terminals STA 3 and STA 4, the access point STA 5 (AP 2) that provides a distribution service, and a distribution system that connects the plurality of access points STA 2 (AP 1) and STA 5 (AP 2). In BSS 2, the access point STA 5 (AP 2) manages the terminals STA 3 and STA 4.

The independent BSS (IBSS) is a BSS that operates in an ad-hoc mode. Since the IBSS does not include an access point, there is no centralized management entity for performing a central management function. That is, in the IBSS, terminals are managed in a distributed manner. The IBSS is a self-contained network, in which all terminals may be mobile terminals and may be disallowed to access the distribution system (DS).

The access points STA 2 (AP 1) and STA 5 (AP 2) provide a connection to the DS through a wireless medium for the associated terminals STA 1, STA 3, and STA 4. In BSS 1 or BSS 2, generally, a communication between the terminals STA 1, STA 3, and STA 4 is made through the access points STA 2 (AP 1) and STA 5 (AP 2). However, when a direct link is established, a direct communication between the terminals STA 1, STA 3, and STA 4 is enabled.

A plurality of infrastructure BBSs may be interconnected through the DS. The plurality of BBSs connected to each other through the DS is called an extended service set (ESS). STAs included in the ESS may communicate with each other, and within the same ESS, a terminal may move from one BSS to another BSS while communicating in a seamless manner.

The DS is a mechanism in which one AP communicates with another AP. By using the DS, an AP may transmit a frame to terminals that is associated with a BSS managed by the AP, or transmit a frame to a terminal that has moved to another BSS. In addition, the AP may transmit and receive a frame to and from an external network such as a wired network. The DS is not necessarily a network and has no limitation in its form as long as a predetermined distribution service specified in the IEEE 802.11 standard can be provided. For example, the DS may be a wireless network such as a mesh network, or may be a physical structure for interconnecting APs.

An AID change method according to an embodiment of the present invention, which will be described below, may be applied to the above IEEE 802.11 WLAN system and also various networks such as a wireless personal area network (WPAN), a wireless body area network (WBAN), and so on.

Figure 2:
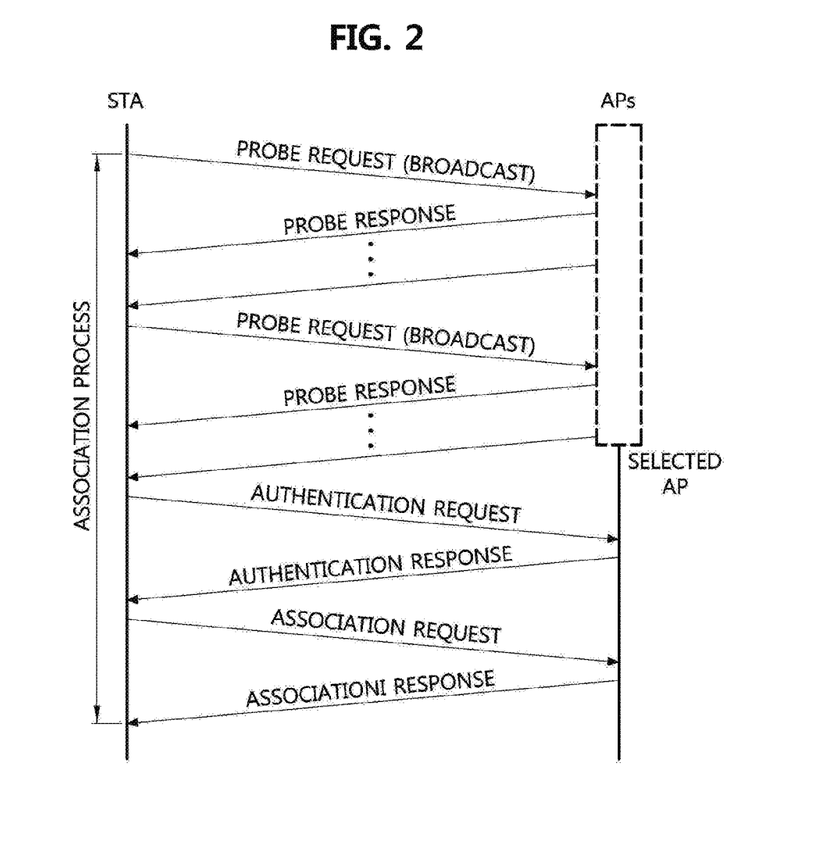
FIG. 2 is a conceptual view showing an association process for a terminal in an infrastructure BSS.

FIG. 2 is a conceptual view showing an association process for a terminal in an infrastructure BSS.

In order for a terminal STA to transmit and receive data in an infrastructure BSS, first, the terminal STA should be associated with an AP.

Referring to FIG. 2, the association process of the terminal STA in the infrastructure BSS may include: 1) probe step of probing an AP, 2) authentication step of authenticating the probed AP, and 3) association step of associating with the authenticated AP.

First, the terminal STA may probe neighboring APs through the probe process. The probe process includes a passive scanning method and an active scanning method. The passive scanning method may be performed by overhearing beacons that are transmitted by the neighboring APs. On the other hand, the active scanning method may be performed by broadcasting a probe request frame. Upon receiving the probe request frame, the AP may transmit a probe response frame corresponding to the probe request frame to the terminal STA. The terminal STA may check the presence of the neighboring APs by receiving the probe response frame.

Subsequently, the terminal STA performs authentication with the probed APs, and may perform the authentication with the plurality of APs. An authentication algorithm conforming to the IEEE 802.11 standard includes an open system algorithm that exchanges two authentication frames and a shared key algorithm that exchanges four authentication frames. Through a process of exchanging the authentication request frame and the authentication response frame based on the authentication algorithm, the terminal STA may perform authentication with the AP.

Last, the terminal STA selects one AP from among the authenticated plurality of APs and performs an association process with the selected AP. That is, the terminal STA transmits an association request frame to the selected AP. Upon receiving the association request frame, the AP transmits the terminal STA to an association response frame corresponding to the association request frame. As such, through the process of exchanging the association request frame and the association response frame, the terminal STA may perform the association process with the AP.

Figure 3:
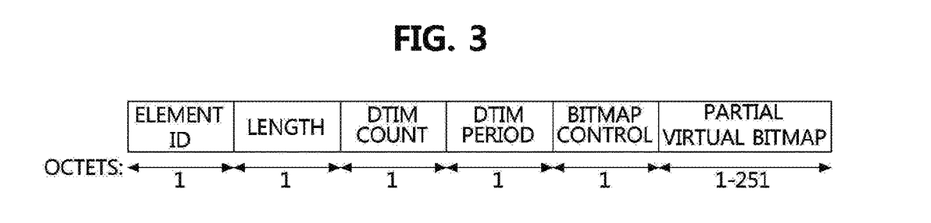
FIG. 3 is a block diagram showing an element of a traffic indication map (TIM) included in a beacon according to an embodiment of the present invention.

FIG. 3 is a block diagram showing an element of a traffic indication map (TIM) included in a beacon according to an embodiment of the present invention.

In the IEEE 802.11 WLAN system, when there is data to be transmitted to the terminal, the AP notifies the terminal that there is data to be transmitted using a TIM in a beacon frame that is periodically transmitted.

Referring to FIG. 3, the TIM includes an element ID field, a length field, a delivery traffic indication message (DTIM) count field, a DTIM period field, a bitmap control field, and a partial virtual bitmap field.

The length field indicates a length of an information field. The DTIM count field indicates the number of beacons before the DTIM. When a DTIM counter is 0, a current TIM is the DTIM. The DTIM counter field is composed of 1 octet. The DTIM period field indicates the number of beacon intervals between consecutive DTIMs. If all TIMs are the DTIMs, a value of the DTIM period field is 1. The DTIM period field is composed of 1 octet.

The bitmap control field is composed of 1 octet, and a bit number 0 of the bitmap control field denotes a traffic indicator bit that is associated with an association ID (AID) 0. When the bit is set as 1 and the value of the DTIM counter field is 0, it can be seen that at least one multicast or broadcast frame is buffered in the AP. The remaining 7 bits of the bitmap control field form a bitmap offset.

The partial virtual bitmap field is composed of 1 to 251 octets, and a bit number N has a value in a range of 0 to 2007. Each bit of the partial virtual bitmap field corresponds to traffic that is buffered for a specific terminal. In a case in which an AID of any terminal is N, the bit number N of the partial virtual bitmap field is set as 0 when there is no buffered traffic and the bit number N of the partial virtual bitmap field is set as 1 when there is buffered traffic.

Figure 4:
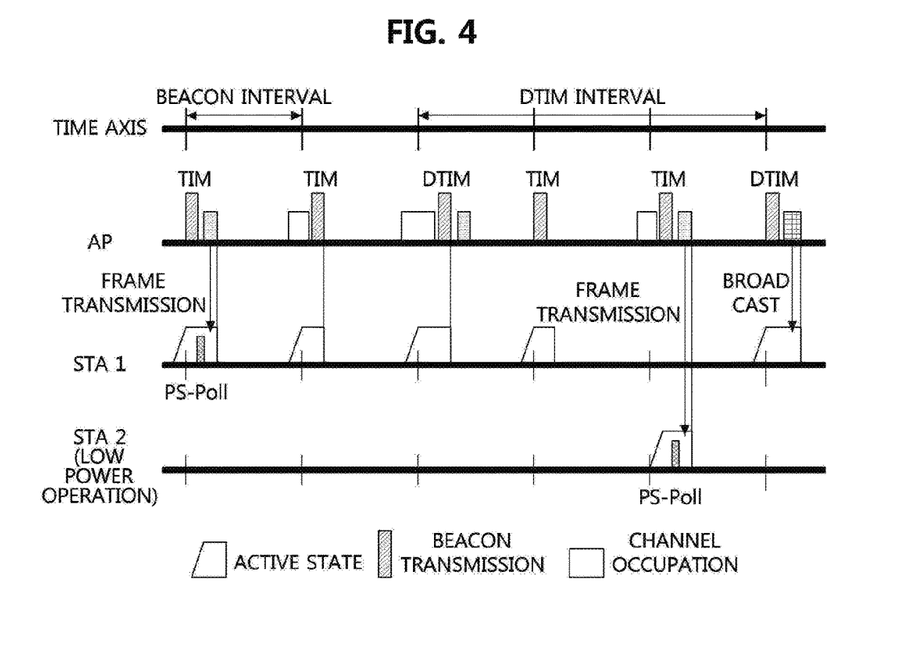
FIG. 4 is a conceptual view showing a data transmission process for an access point according to an embodiment of the present invention.

FIG. 4 is a conceptual view showing a data transmission process for an access point according to an embodiment of the present invention.

Referring to FIG. 4, the AP broadcasts a beacon periodically and may broadcast a beacon including the DTIM at every 3 beacon intervals. The terminals STA 1 and STA2 periodically wake up from a power save mode (PSM) and receive the beacon, and check the TIM or DTIM included in the beacon to determine whether the data to be transmitted to the terminals is buffered in the AP. In this case, when there is the buffered data, the terminals STA 1 and STA 2 maintain awake and receive the data from the AP. When there is no buffered data, the terminals STA 1 and STA 2 return to the PSM (that is, a doze state).

That is, when a bit in the TIM corresponding to an AID of the terminal STA 1 or STA 2 is set as 1, the terminal STA 1 or STA 2 transmits, to the AP, a power save (PS)-Poll frame (or a trigger frame) that informs the AP that the terminal STA is awake and ready to receive data. The AP may determine that the terminal STA 1 or STA 2 is ready to receive the data by receiving the PS-Poll frame and then may transmit the data or an acknowledgement (ACK) to the terminal STA 1 or STA 2. When the AP transmits the ACK to the terminal STA 1 or STA 2, the AP transmits data to the terminal STA 1 or STA 2 at an appropriate time. On the other hand, when the bit in the TIM corresponding to the AID of the terminal STA 1 or STA 2 is set as 0, the terminal STA 1 or STA 2 returns to the PSM.

A one-time bit setting for AIDs of a plurality of terminals may be enabled on the TIM (or DTIM) included in the beacon. Accordingly, after the AP broadcasts a beacon, a plurality of terminals, in which bits corresponding to their own AIDs are set as 1, transmit the PS-Poll to the AP at the same time. In this case, wireless channel access competitions for transmitting the PS-Poll frame between the plurality of terminals are getting worse, and in addition, collisions between the terminals may occur due to a hidden node problem, which is a chronic problem in a WLAN system.

For example, the above described situations may frequently occur in a WLAN service that supports thousands of low-power sensor terminals. In this case, since the terminal s should keep awake to completely receive data or repeatedly perform retransmission of the PS-Poll frame that is not transmitted due to the collision, power consumption may be serious.

Figure 5:
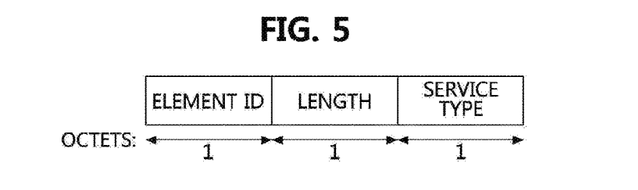
FIG. 5 is a block diagram showing a frame structure for designating a service type of a terminal according to an embodiment of the present invention.
Figure 6:
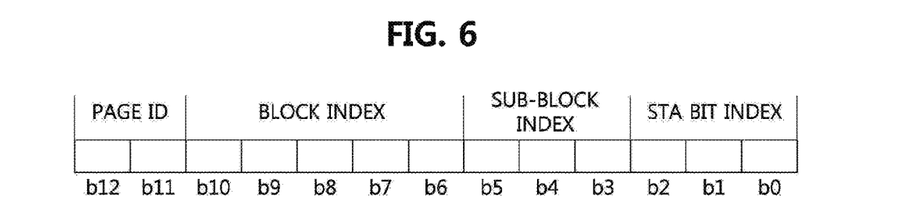
FIG. 6 is a block diagram showing an AID structure according to an embodiment of the present invention.

FIG. 6 is a block diagram showing an AID structure according to an embodiment of the present invention, and FIG. 5 is a block diagram showing a frame structure for designating a service type of a terminal according to an embodiment of the present invention. When there are many terminals that receive a service through one AP and the terminals may be grouped by similar characteristics, the AP may group and manage AIDs of the terminals.

Referring to FIG. 6, the AID structure includes a page ID field, a block index field, a sub-block index field, and a STA bit index field. That is, the AID may be managed as a hierarchical group in units of pages/blocks/sub-blocks.

Referring to FIG. 5, a terminal may designate a service type of an association request frame and transmit the service type to the AP. The service type may include a type of a low-power terminal, a type of a terminal having a channel access priority, a type of a general terminal, etc.

That is, the terminal may transmit the association request frame in which the service type is designated to the AP, and the AP may designate a group of the terminal using pages/blocks/sub-blocks corresponding to the service type and assign an AID according to the designated group.

Figure 7:
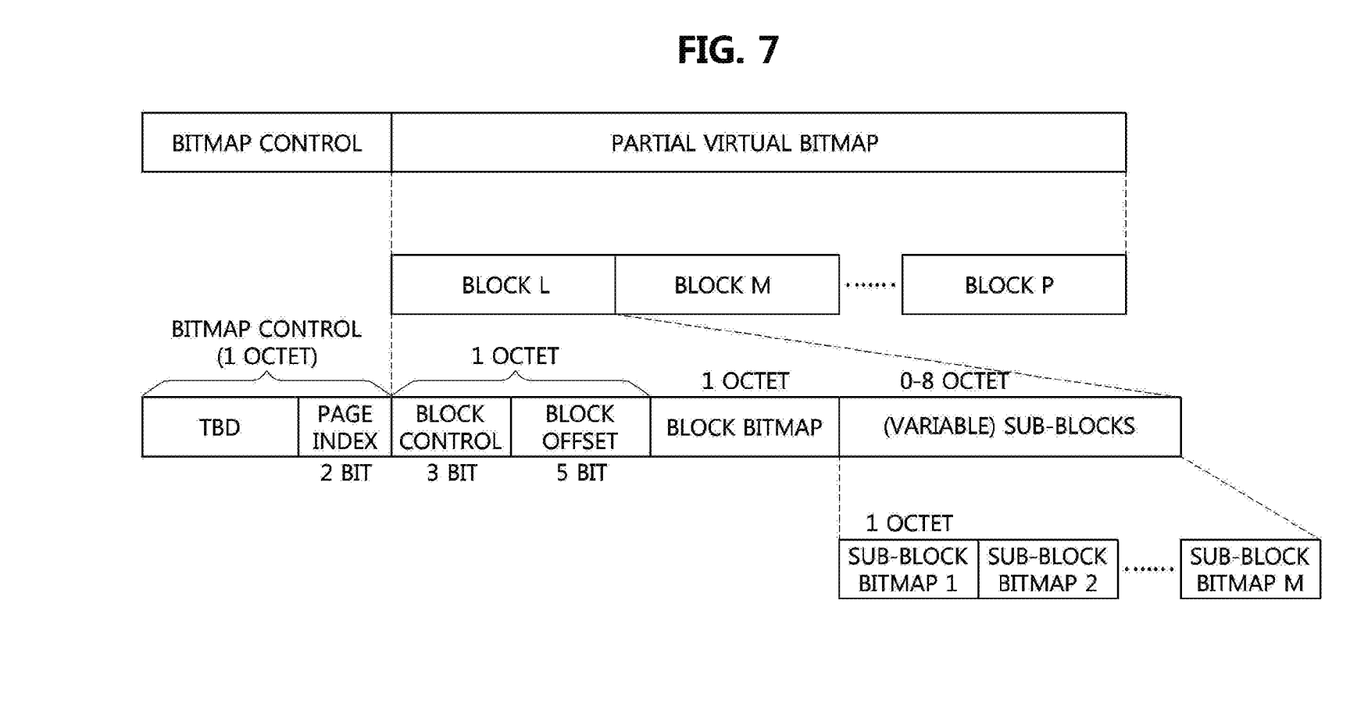
FIG. 7 is a conceptual view showing a structure of a TIM that is encoded in units of blocks according to an embodiment of the present invention.

FIG. 7 is a conceptual view showing a structure of a TIM that is encoded in units of blocks according to an embodiment of the present invention.

Referring to FIG. 7, the partial virtual bitmap field includes at least one block field (block L, block M, . . . , block P). One block field includes a block control field, a block offset field, a block bitmap field, and a sub-block field having various sizes. The sub-block field includes at least one sub-block bitmap field (sub-block bitmap 1, sub-block bitmap 2, . . . , sub-block bitmap M).

The block control field indicates a TIM encoding mode (that is, a block bitmap mode, a single AID mode, an OLB (offset+length+bitmap) mode, or an inverse mode). The block offset field indicates an offset value of the encoded block. The block bitmap field is a bitmap indicating a sub-block in which an AID bit is set among sub-blocks in a block that is indicated by the block offset. The sub-block field indicates a bit map for the AID in the sub-block.

Figure 8:
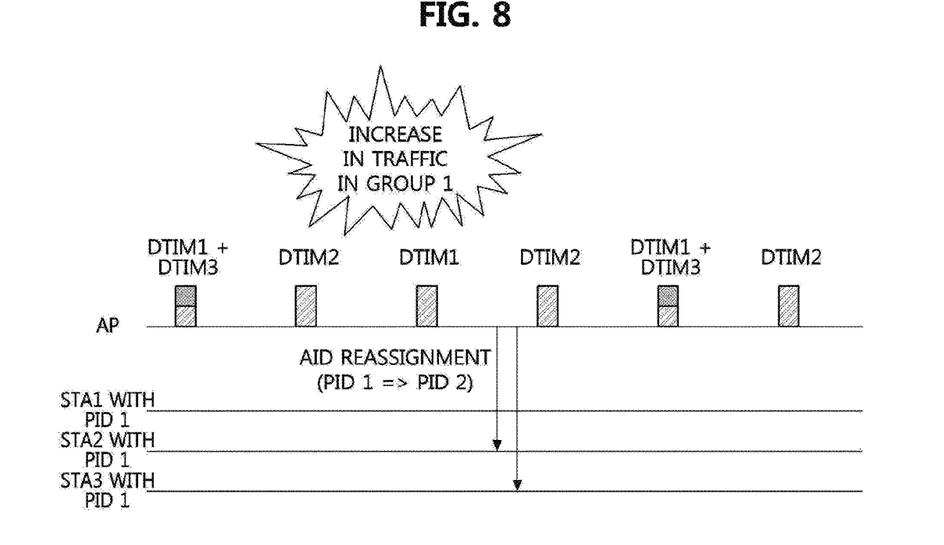
FIG. 8 is a conceptual view showing a process of reassigning an AID to a group.

FIG. 8 is a conceptual view showing a process of reassigning an AID to a group.

Referring to FIG. 8, when traffic having a specific period increases and thus a group including stations STA 1, STA 2, and STA 3 needs to be changed while the AP groups and manages the stations STA 1, STA 2, and STA 3, the AP may transmit an AID reassignment frame to a corresponding STA after transmitting the DTIM or receiving the PS-Poll from the STA.

That is, the AP may manage the stations STA 1, STA 2, and STA 3 as one group, and the stations STA 1, STA 2, and STA 3 may have PID 1 as a group ID. When traffic for group 1 including the stations STA 1, STA 2, and STA 3 increases, the AP may transmit an AID reassignment frame to STA 2 and STA 3 in order to manage STA 2 and STA 3 as another group (for example, group 2). Upon receiving the AID reassignment frame, STA 2 and STA 3 may change their group ID from PID 1 to PID 2.

The AP may assign, to each station that requests an association, an AID of a group corresponding to characteristics of the station and may receive and operate the same number of stations as the maximum number of AIDs that can be assigned. As a result, when all AIDs are used, all group AID (that is, the number of AIDs is predetermined for load balancing for each group) are used, or an AID change is needed for another reason, the AIDs of the plurality of stations should be simultaneously changed. However, since listen interval values of the stations are different from each other and also wake-up times of the stations are different from each other, the AIDs cannot be changed simultaneously, thus causing AID collisions.

Figure 9:
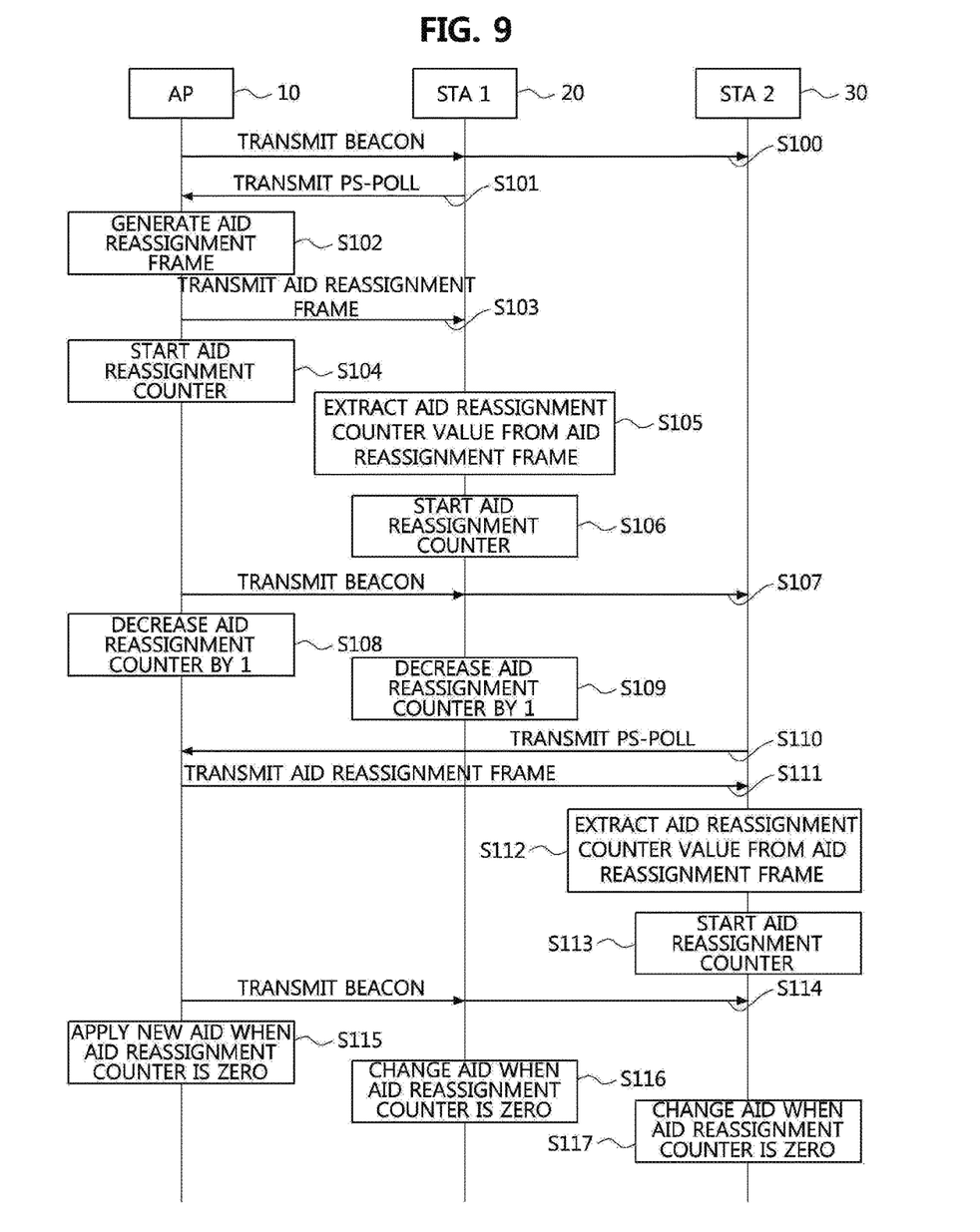
FIG. 9 is a flowchart showing an AID change method according to an embodiment of the present invention.

FIG. 9 is a flowchart showing a method of changing an AID according to an embodiment of the present invention.

Referring to FIG. 9, the AP 10 may broadcast a beacon including a TIM or DTIM (S100). Among STA 1 20 and STA 2 30, STA 1 20 may wake up from a power save mode (PSM) earlier than STA 2 30 and transmit a PS-Poll to the AP 10 (S101).

Upon receiving the PS-Poll of STA 1 20, the AP 10 may generate an AID reassignment frame (S102). That is, when the AP 10 desires to change AIDs of STA 1 20 and STA 2

30, the AP 10 may generate the AID reassignment frame upon receiving the PS-Poll from STA 1 20 or STA 2 30.

The AID reassignment frame may include a desired new AID and an AID reassignment counter value that designates a time at which a change to the new AID is made. The AID reassignment counter indicates a time at which an old AID is changed to a new AID (that is, a new AID included in the AID reassignment frame) and denotes the number of beacon intervals of the access point 10. For example, the AID reassignment counter value of 5 indicates that the old AID is changed to the new AID after five beacon intervals have passed since a reception time of the AID reassignment counter, and the AID reassignment counter value of 0 indicates that the old AID is changed to the new AID when the AID reassignment counter is received.

When the AP 10 desires to change the AIDs of STA 1 20 and STA 2 30 at the same time, the AP 10 may set an AID reassignment counter value in consideration of both of a listen interval of STA 1 20 and a listen interval of STA 2 30. That is, the AP 10 may set the AID reassignment counter value such that an old AID is changed to a new AID after a longest listen interval among the listen interval of STA 1 20 and the listen interval of STA 2 30

For example, at a current time, when the number of remaining listen intervals of STA 1 20 is 5 and the number of remaining listen intervals of STA 2 30 is 10, the AP 10 may set the AID reassignment counter value for STA 1 20 and STA 2 30 as 10.

Figure 10:
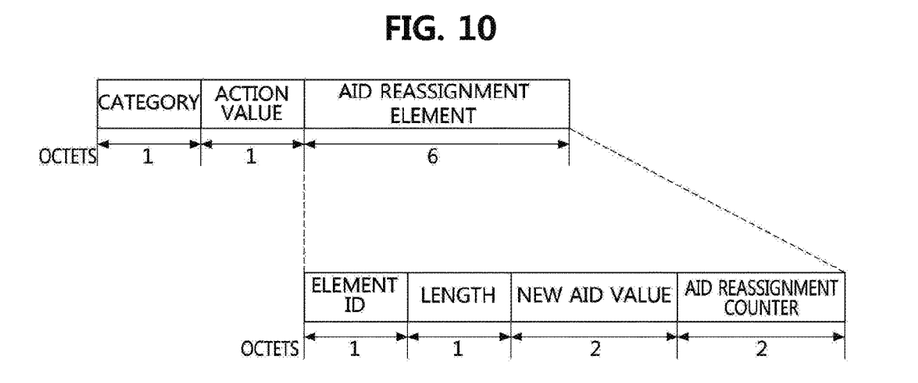
FIG. 10 is a block diagram showing an AID reassignment frame according to an embodiment of the present invention.

FIG. 10 is a block diagram showing an AID reassignment frame according to an embodiment of the present invention.

Referring to FIG. 10, a body of the AID reassignment frame may include a category field, an action value field, and an AID reassignment element field. Here, the category field may have a size of 1 octet, and the action value field may have a size of 1 octet.

The AID reassignment element field may have a size of 6 octets and include an element ID field, a length field, a new AID value field, and an AID reassignment counter field. The element ID field may have a size of 1 octet, and the length field may have a size of 1 octet. The new AID value field may indicate an AID value intended to be changed and have a size of 2 octets. The AID reassignment counter field may indicate a time at which an old AID is changed to a new AID and have a size of 2 octets.

Here, the AID reassignment frame is not limited to a frame that is shown in FIG. 10, and may include various forms.

Referring again to FIG. 9, the AP 10 may transmit an AID reassignment frame to STA 1 20 (S103). The AP 10 may start an AID reassignment counter for an AP, which has the AID reassignment counter value included in the AID reassignment frame as an initial value after transmitting the AID reassignment frame (or while transmitting the AID reassignment frame) (S104). The AID reassignment counter for the AP is a counter used inside the AP 10 that decreases by 1 whenever the beacon is transmitted and expires when the counter reaches zero. When the AID reassignment counter for the AP is zero, the AP 10 applies a new ID to a corresponding station.

Even when the AP 10 does not receive a PS-Poll from STA 1 20, the AP 10 may generate the AID reassignment frame. That is, when the AP 10 sets a TIM bitmap corresponding to the AID of STA 1 20 to broadcast a beacon, the AP 10 may generate the AID reassignment frame and transmit the AID reassignment frame to STA 1 20 after a predefined time (for example, SIFS etc.) has passed.

Alternatively, when the AP 10 receives a specific frame that requests AID reassignment from STA 1 20, the AP 10 may generate the AID reassignment frame and transmit the AID reassignment frame to STA 1 20 after a predefined time (for example, SIFS etc.) has passed.

Here, upon receiving the AID reassignment frame, STA 1 20 may transmit an ACK frame, which is a response to the reception of the AID reassignment frame, to the AP 10.

Upon receiving the AID reassignment frame, STA 1 20 may extract an AID reassignment counter value from the AID reassignment frame (S105). In this case, when the extracted AID reassignment counter value is zero, STA 1 20 may change an old AID to a new AID (that is, a new AID included in the AID reassignment frame).

On the other hand, when the extracted AID reassignment counter value is not zero, STA 1 20 may start an AID reassignment counter for STA 1 having the AID reassignment counter value as an initial value (S106). The AID reassignment counter for STA 1 is a counter that is used inside STA 1 20, and STA 1 20 may decrease the AID reassignment counter by 1 whenever receiving the beacon or decrease the AID reassignment counter by 1 at beacon intervals (for example, every 100 ms).

Then, the AP 10 may broadcast a beacon at beacon intervals (S107). After transmitting the beacon (or while transmitting the beacon), the AP 10 may decrease the AID reassignment counter by 1 (S108). STA 1 20 may decrease the AID reassignment counter by 1 when the beacon is received or when the beacon interval has passed (S109).

STA 2 30 may wake up from a power save mode and transmit a PS-Poll to the AP 10 (S110). Upon receiving the PS-Poll of STA 2 30, the AP 10 may transmits the AID reassignment frame including the AID reassignment counter value at a current time to STA 2 30 (S111).

Upon receiving the AID reassignment frame, STA 2 30 may extract an AID reassignment counter value from the AID reassignment frame (S112). In this case, when the extracted AID reassignment counter value is zero, STA 2 30 may change an old AID to a new AID (that is, a new AID included in the AID reassignment frame).

On the other hand, when the extracted AID reassignment counter value is not zero, STA 2 30 may start an AID reassignment counter for STA 2 having the AID reassignment counter value as an initial value (S113). The AID reassignment counter for STA 2 is a counter that is used inside STA 2 30, and STA 2 30 may decrease the AID reassignment counter by 1 whenever receiving the beacon or decrease the AID reassignment counter by 1 at beacon intervals (for example, every 100 ms).

Then, the AP 10 may broadcast a beacon at beacon intervals (S114). The AP 10 may decrease the AID reassignment counter by 1 after transmitting the beacon (or while transmitting the beacon), and may apply a new AID when the AID reassignment counter reaches zero (S115). The STA 1 20 may decrease the AID reassignment counter by 1 when the beacon is received or the beacon interval has passed, and may change an old AID to a new AID when the AID reassignment counter reaches zero (S116). The STA 2 30 may decrease the AID reassignment counter by 1 when the beacon is received or the beacon interval has passed, and may change an old AID to a new AID when the AID reassignment counter reaches zero (S117).

That is, the AID reassignment counter values of the AP 10 and the stations 20 and 30 are all zero when any beacon is transmitted (or at any beacon interval). At this point, the AP 10 may apply new AIDs to the stations 20 and 30, and the stations 20 and 30 may change old AIDs to the new AIDs.

Figure 11:
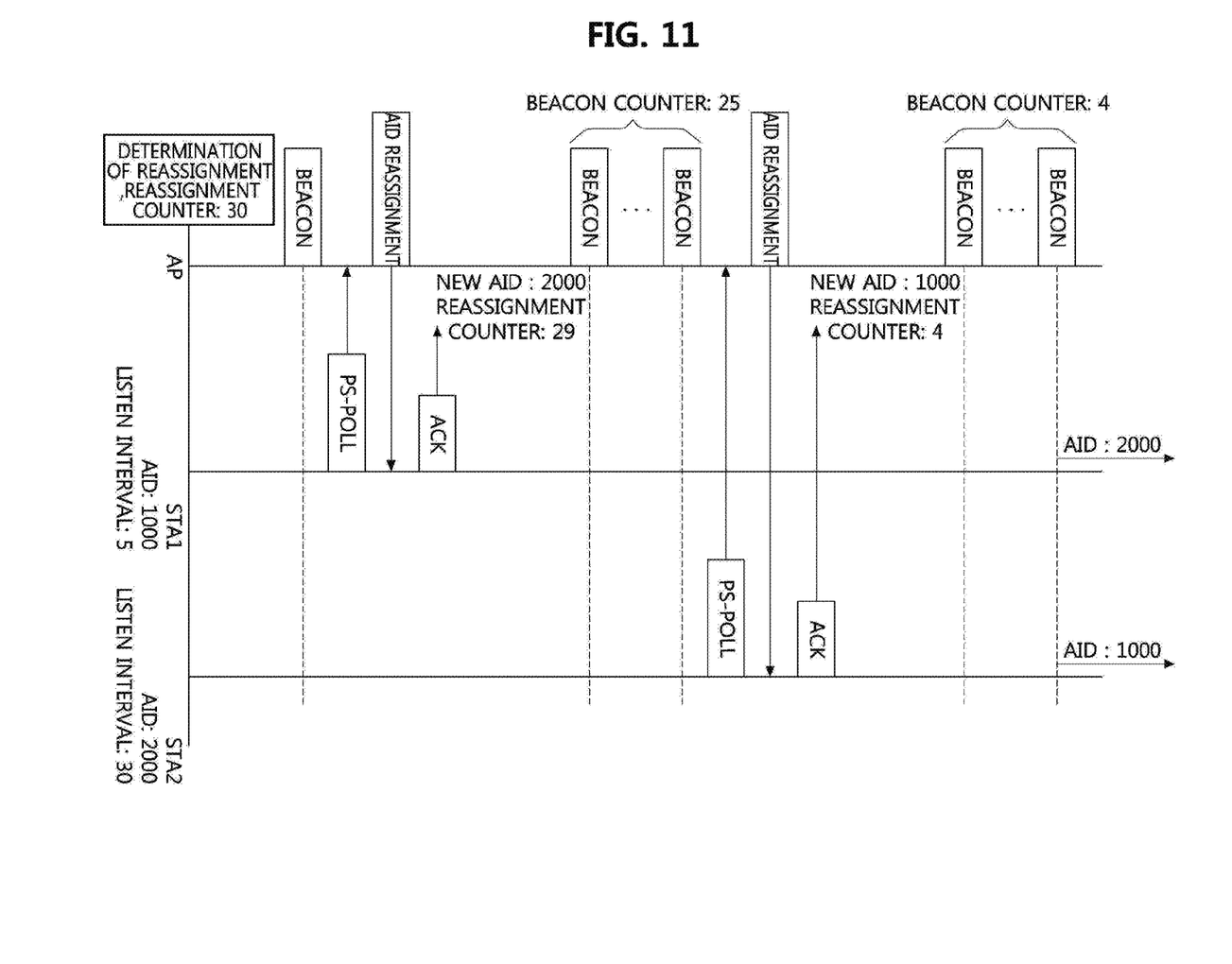
FIG. 11 is a conceptual view showing an AID change process for a plurality of stations.

FIG. 11 is a conceptual view showing an AID change process for a plurality of stations.

Referring to FIG. 11, when the AIDs of STA 1 and STA 2 are intended to be changed at the same time, the AP may generate an AID reassignment frame. The AID reassignment frame may include a new AID and an AID reassignment counter that indicates a time at which a change to the new AID is made.

When the AID of STA 1 is intended to be changed from 1000 to 2000, the AP may determine a new AID included in an AID reassignment frame for STA 1 as 2000. When the AID of STA 2 is intended to be changed from 2000 to 1000, the AP may determine a new AID included in an AID reassignment frame for STA 2 as 1000.

When the AP determines the AID reassignment counter, the AP may consider a listen interval of STA 1 and a listen interval of STA 2. In this case, the AP may determine a longest listen interval among the listen interval of STA 1 and the listen interval of STA 2 as the AID reassignment counter. That is, since the number of listen intervals of STA 1 is 5 and the number of listen intervals of STA 2 is 30, the AP may determine the AID reassignment counter included in the AID reassignment frames for STA 1 and STA 2 as 30.

According to the above process, the AID reassignment frame for STA 1 has the new AID of 2000 and the AID reassignment counter of 30. The AID reassignment frame for STA 2 has the new AID of 1000 and the AID reassignment counter of 30.

STA 1 may wake up from a power save mode and transmit a PS-Poll to the AP 10. Upon receiving the PS-Poll from STA 1, the AP may generate the above AID reassignment frame (new AID: 2000 and AID reassignment counter: 29) and transmit the generated AID reassignment frame to STA 1. Here, since one beacon is transmitted (that is, 1 beacon interval has passed), the AID reassignment counter value decreases to 29 by 1. Upon receiving the AID reassignment frame, STA 1 may transmit an ACK frame to the AP and set the AID reassignment counter value of 29 included in the AID reassignment frame to be an initial value to start the AID reassignment counter. That is, STA 1 may decrease the AID reassignment counter by 1 at beacon intervals (or when the beacon is transmitted).

Then, the AP may transmit a beacon at beacon intervals. STA 2 may wake up from a power save mode and transmit a PS-Poll to the AP 10. Upon receiving the PS-Poll from STA 2, the AP may generate the above AID reassignment frame (new AID: 2000 and AID reassignment counter: 4) and transmit the generated AID reassignment frame to STA 2. Here, since 26 beacons are transmitted (that is, 26 beacon intervals have passed), the AID reassignment counter value decreases to 4 by 26. Upon receiving the AID reassignment frame, STA 2 may transmit an ACK frame to the AP and set the AID reassignment counter value (that is, 4) included in the AID reassignment frame to be an initial value to start the AID reassignment counter. That is, STA 2 may decrease the AID reassignment counter by 1 at beacon intervals (or when the beacon is transmitted).

Then the AP may transmit a beacon at beacon intervals, and when four beacons are further transmitted (that is, four beacon intervals have passed), values of the AID reassignment counters for STA 1 and STA 2 become zero. When the AP determines the AID reassignment counter, the AP may consider a listen interval of STA 1 and a listen interval of STA 2. Furthermore, STA 1 may change the AID from 1000 to 2000, and STA 2 may change the AID from 2000 to 1000.

According to an embodiment of the present invention, a collision between AIDs may be prevented when an AID of one station is changed or AIDs of a plurality of stations are changed while all of the AIDs are in use. Furthermore, a stable and reliable network service may be provided by preventing the collision between AIDs, and cost may be saved because an additional access point does not have to be installed to secure a separate preliminary AID.

While the example embodiments of the present invention and their advantages have been described in detail, it should be understood that various changes, substitutions and alterations may be made herein without departing from the scope of the invention.

What is claimed is:

1. A method of switching an association ID (AID) of a terminal, the method comprising:
   receiving, by the terminal from an access point, an AID switch response frame including an AID response element, wherein the AID response element includes an AID field and information related to a listen interval of the terminal; and
   switching to a new AID, when an AID included in the AID field of the AID response element is not same as a current AID of the terminal.

2. The method of claim 1, wherein the AID switch response frame is transmitted by the access point in response to an AID switch request frame transmitted by the terminal to the access point, wherein the AID switch request frame includes information indicating a listen interval of the terminal.

3. The method of claim 1, wherein the AID switch response frame is unsolicitedly transmitted by the access point.

4. The method of claim 1, wherein the information related to the listen interval of the terminal includes AID switch count information.

5. The method of claim 4, wherein the AID switch count information indicates a countdown value, in units of beacon interval, that the AP sets for the terminal to switch to the new AID.

6. The method of claim 4, a counter that corresponds to the AID switch count information starts upon transmission of the AID response element.

7. A method of switching, by an access point, an association ID (AID) of a terminal, the method comprising:
   generating, by the access point, an AID switch response frame including an AID response element,
   wherein the AID response element includes an AID field and information related to a listen interval of the terminal; and
   transmitting, by the access point to the terminal, the AID switch response frame,
   wherein the AID of the terminal is switched to a new AID, when an AID included in the AID field of the AID response element is not same as a current AID of the terminal.

8. The method of claim 7, wherein the AID switch response frame is transmitted by the access point in response to an AID switch request frame transmitted by the terminal to the access point, wherein the AID switch request frame includes information indicating a listen interval of the terminal.

9. The method of claim 7, wherein the AID switch response frame is unsolicitedly transmitted by the access point.

10. The method of claim 7, wherein the information related to the listen interval of the terminal includes AID switch count information.

11. The method of claim 10, wherein the AID switch count information indicates a countdown value, in units of beacon interval, that the AP sets for the terminal to switch to the new AID.

12. The method of claim 10, a counter that corresponds to the AID switch count information starts upon transmission of the AID response element.

13. A terminal for changing an association ID (AID), the terminal comprising:

a transceiver; and a processor, wherein the processor is configured to:

receive, from an access point, using the transceiver, an AID switch response frame including an AID response element, wherein the AID response element includes an AID field and information related to a listen interval of the terminal;

switch to a new AID, when an AID included in the AID field of the AID response element is not same as a current AID of the terminal.

14. An access point for changing an association ID (AID) of a terminal, the access point comprising:

a transceiver; and a processor, wherein the processor is configured to:

generate an AID switch response frame including an AID response element, wherein the AID response element includes an AID field and information related to a listen interval of the terminal; and transmitting, to the terminal, using the transceiver, the AID switch response frame, wherein the AID of the terminal is switched to a new AID, when an AID included in the AID field of the AID response element is not same as a current AID of the terminal.

* * * * *